United States Patent [19]

Storer

[11] 4,067,526

[45] Jan. 10, 1978

[54] SUPPORT-FOOT AND CORD-RETAINER

[75] Inventor: Clyde K. Storer, Columbus, Ohio

[73] Assignee: The Buckeye Stamping Company, Columbus, Ohio

[21] Appl. No.: 743,509

[22] Filed: Nov. 19, 1976

[51] Int. Cl.² .......................................... B65H 75/36
[52] U.S. Cl. .................................. 248/65; 242/85.1; 248/201; 248/314; 339/119 C
[58] Field of Search ................ 248/51, 52, 67.5, 201, 248/309 R, 309 A, 314, 188.8, 65; 339/119 R, 119 C; 242/85.1; 191/12.4; 24/129 D, 130; 174/66

[56] References Cited

U.S. PATENT DOCUMENTS

| | | | |
|---|---|---|---|
| 2,001,588 | 5/1935 | Sprague | 242/85.1 X |
| 2,143,529 | 1/1939 | White | 242/85.1 X |
| 2,181,065 | 11/1939 | Pfeiffer et al. | 248/314 X |
| 2,277,468 | 3/1942 | Welch | 248/309 R X |
| 2,536,776 | 1/1951 | Smellie | 242/85.1 X |
| 2,693,001 | 11/1954 | Vance | 242/85.1 X |
| 3,111,753 | 11/1963 | Seibold | 242/85.1 X |
| 3,249,318 | 5/1966 | Wormser | 242/85.1 |
| 3,930,116 | 12/1975 | Richards | 339/119 C X |

FOREIGN PATENT DOCUMENTS

| | | | |
|---|---|---|---|
| 2,259,513 | 8/1975 | France | 339/119 C |
| 502,346 | 7/1930 | Germany | 339/119 C |

*Primary Examiner*—Ramon S. Britts
*Assistant Examiner*—Rodney H. Bonck
*Attorney, Agent, or Firm*—Wm. V. Miller

[57] ABSTRACT

A foot for use, for example, on cases for electrical instruments or appliances which is formed to not only support the case but also, when used in a combination of two or more, to provide retainers on which the electrical cord can be wrapped. In addition, the foot is formed with a socket arrangement for receiving and retaining the plug on the cord, regardless of whether the plug is of the two-prong or three-prong type.

6 Claims, 11 Drawing Figures

SUPPORT-FOOT AND CORD-RETAINER

BACKGROUND AND BRIEF DESCRIPTION OF THE INVENTION

Cases for electrical instruments or small appliances are commonly supported by feet member, which are molded separately, usually of plastic, and then fastened in place on the bottom of the case. Sometimes these feet are so formed that the electrical cord of the instrument or appliance can be wound thereon and will be retained thereby. However, there has been no provision for receiving and retaining the plug of the cord and it usually must be tied into the cord.

The present invention provides a simple inexpensive molded member, preferably of plastic, which, when used in multiples, can support the case and can serve as effective retaining means for the cord. In addition, each foot is so formed that it also can receive and retain the plug, whether the plug is of the two-prong or three-prong type.

Although the molded member of this invention is especially useful as a foot, it could be applied to other parts of the case and used only as a cord retainer.

BRIEF DESCRIPTION OF THE DRAWINGS

The best mode contemplated in carrying out this invention is illustrated in the accompanying drawings in which.

DETAILED DESCRIPTION OF THE INVENTION

Figure 1:
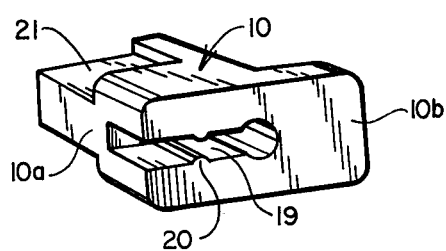
FIG. 1 is a perspective view of the molded member or foot.
Figure 2:
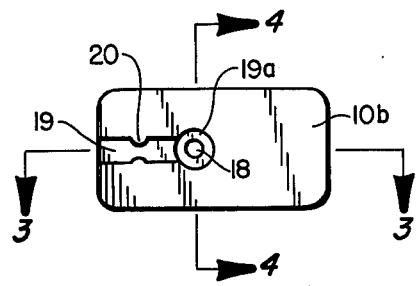
FIG. 2 is a bottom view of the foot.
Figure 3:
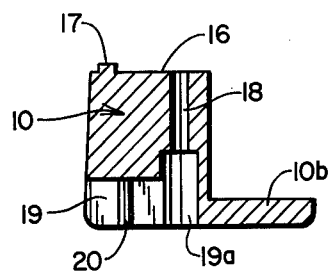
FIG. 3 is a sectional view taken along line 3—3 of FIG. 2.
Figure 4:
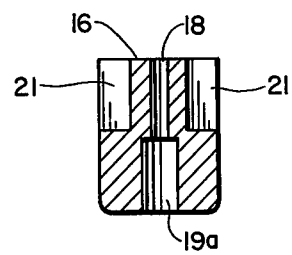
FIG. 4 is a sectional view taken along line 4—4 of FIG. 2.
Figure 5:
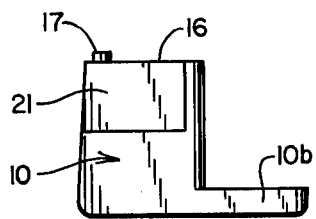
FIG. 5 is a side elevational view of the foot.
Figure 6:
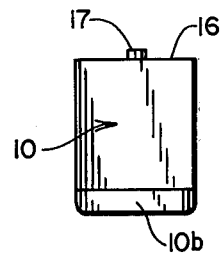
FIG. 6 is an end elevational view of the foot.
Figure 7:
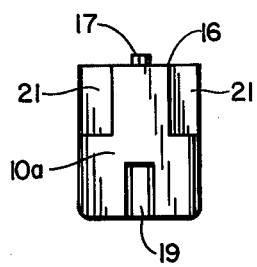
FIG. 7 is an elevational view from the opposite end of the foot.
Figure 8:
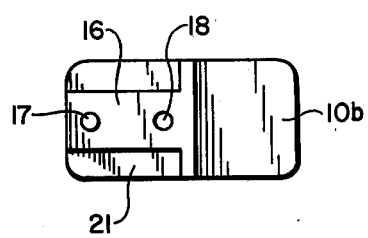
FIG. 8 is a top view of the foot.

With reference to the drawings, this invention is illustrated in detail in FIGS. 1 to 8 as an integral member which is preferably molded from a suitable plastic, such as polypropylene, and which is designed to function as a support and a cord-retainer but may be used at times for either of these purposes. It will be described as a foot and is shown in FIGS. 3 to 7 in the normal position it occupies but, as indicated, it is not limited to this use.

The member is molded to provide a body 10 with the usual inward draft or taper toward the top. The top surface of this body is flat, as indicated at 16, and has a locator projection 17 toward one end. Toward its opposite end, in alignment with the locator 17, is a screw-receiving bore 18 which communicates at its lower end with a keyhole slot 19. This slot 19 is open at its bottom and at its one end which is at the end 10a of the body 10. The rounded part 19a of the slot 19 permits insertion of a mounting screw into the bore 18 and is large enough to receive the head of the screw which will be finally positioned therein. It will be noted that the rounded part 19a is deeper than the straight part to provide a countersink in which the screw head will be finally positioned. Intermediate its ends, the walls of the straight part of the slot 19 are provided with a pair of opposed friction-producing prong-engaging ribs or shoulders 20.

The body 10 is further provided with a pair of opposed prong-receiving recesses 21 which are formed in its sides. It will be noted that each of these recesses not only is open at the side of the body but also at its upper edge and the end 10a of the body where the keyhole slot 19 opens. It will be noted that these recesses are on opposite sides of the centerline of the slot 19 and parallel thereto but are at a higher level.

The body 10a is further provided at its lower side with a retainer flange or extension 10b which projects laterally a substantial distance at the end opposite the end 10a.

Figure 9:
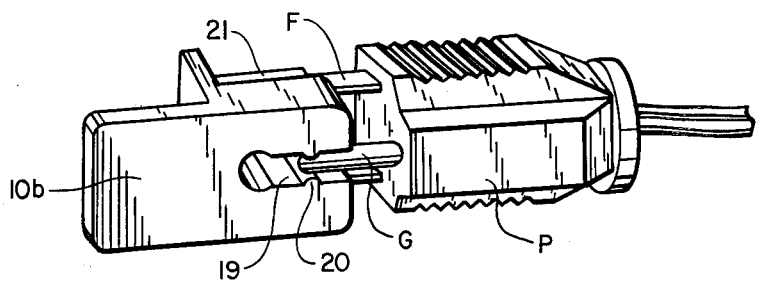
FIG. 9 is a perspective view showing an electrical plug being inserted into the foot.

FIG. 9 is an illustration of how an electrical plug of the three-prong type will cooperate with the member of this invention. It will be noted that the plug P will be inserted at the end 10a opposite the location of the flange 10b. The ground-prong G, which is of circular cross-section, will be received by the socket formed by the slot 19 and will be retained by frictional engagement of the shoulders 20 therewith. The flat contact prongs F will be received by the sockets formed by the recesses 21 and will frictionally engage the portion of the body therebetween. Thus, the plug will be retained in position until removed. If there is no prong G, the prongs F will be received in the same manner by the recesses 21.

Figure 10:
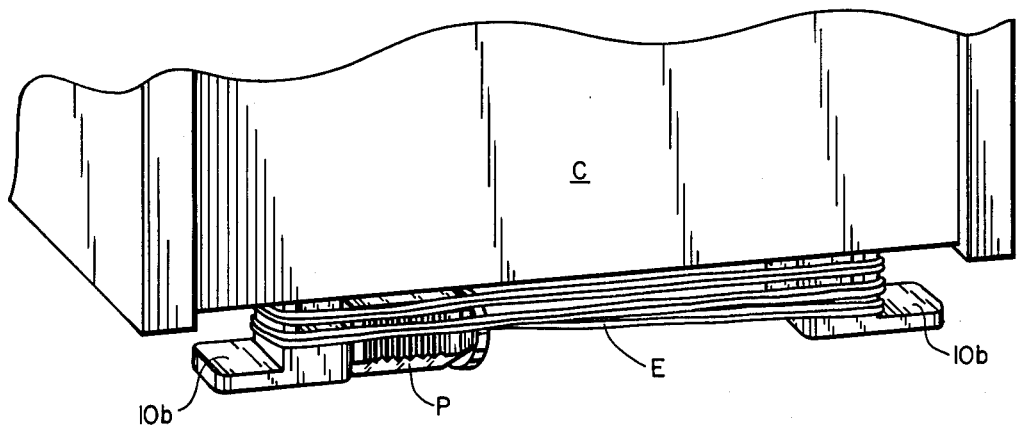
FIG. 10 is a perspective view showing two of the feet on a case retaining an electrical cord and plug.

In FIG. 10, the invention is shown applied to the bottom of a case C and used as a support foot. Two of these members are shown and are so disposed that the flanges 10b project in opposite directions. Thus, there is provided an arrangement whereby the electrical cord E can be wound around the bodies 10 of the members inwardly of the retaining flanges 10b. The plug P can be inserted in the closest foot in the manner described with reference to FIG. 9 and will not interfere with its support function. In mounting each foot, it is only necessary to drill two small holes for receiving locator 17 and the mounting screw.

Figure 11:
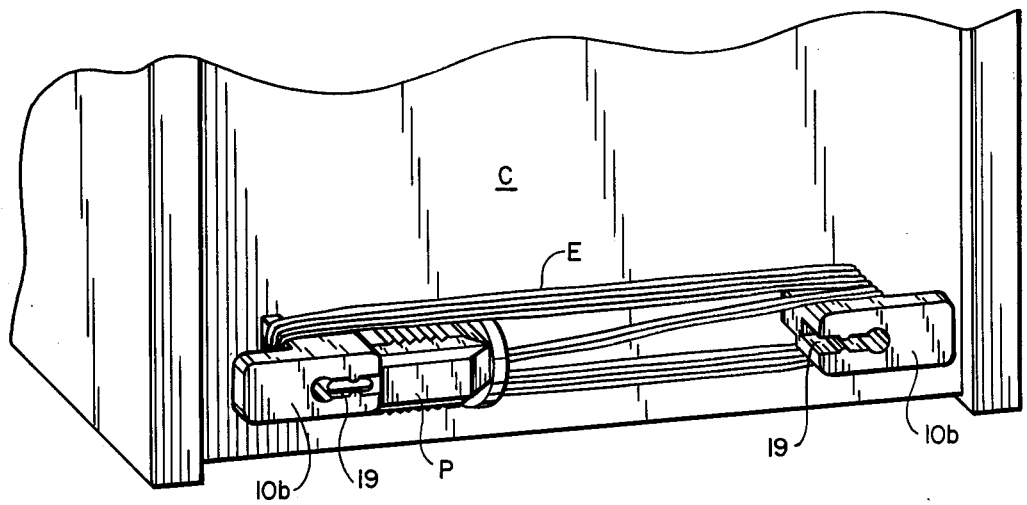
FIG. 11 is a similar view but showing a different application of the invention.

In FIG. 11, an identical arrangement is shown except that a pair of the members are mounted at the side of the case C. In this instance, they would serve only as a cord-retainer and not as a case-support.

Thus, the retainer member has the retainer flange on one end of the body spaced from its inner face to provide a space or socket for receiving the cord winding. The other end of the body is provided with the prong-receiving sockets for receiving the plug. These sockets are all parallel to each other and to the centerline of the body and consist of the one pair with its sockets in a common plane and the single socket spaced from that plane and in a plane at a right angle thereto midway of the sockets of the pair.

It will be apparent from the above that this invention provides a simple inexpensive molded member which can serve as both a support and a cord and plug retainer, although it may be used for either purpose, alone, at times.

Having thus described this invention, what is claimed is:

1. A retainer member for an electrical cord or the like comprising a body having opposed ends, an outer face adapted to be exposed and an inner face adapted to be engaged with a support surface, and surfaces which extend between the respective faces and ends of the body which extends from one face to the other at opposite sides of a centerline of the body; a cord-retainer flange projecting from said body at the outer face thereof and from one end thereof, a prong-receiving socket formed in said body and opening outwardly at a prong-receiving end of said body opposite to the end where said cord-retainer flange is formed, and a pair of prong-receiving sockets formed in said body in cooperative relationship with said first socket and opening at the same prong-receiving end of said body; said first prong-receiving socket being formed by a slot having an end opening at the said prong-receiving end of said body and a side opening at said outer face of the body and having a centerline in a common plane with that of the body, said pair of prong-receiving sockets being formed by recesses in the respective side surfaces of the body that are parallel to each other and to the centerline of the body and which open to the said prong-receiving end and the said inner face of the body.

2. A retainer according to claim 1 in which the slot is a key-hole slot having a main straight part joining an inner rounded part and has inwardly-extending opposed prong-engaging friction ribs intermediate its length in the straight part thereof.

3. A retainer according to claim 2 in which the rounded part of the slot communicates with a mounting-screw bore which extends through the body to the said inner face.

4. A retainer according to claim 3 in which the bore is of lesser diameter than the rounded part of the slot, and the rounded part of the slot extends inwardly from the outer face deeper than the straight part of the slot.

5. A retainer according to claim 4 in which the inner face has a locator projection formed thereon spaced from said bore.

6. In combination, a pair of the retainers claimed in claim 1 secured to a support surface with their flanges projecting in opposite directions.

* * * * *